United States Patent
Cohen-Alloro et al.

[15] 3,703,237
[45] Nov. 21, 1972

[54] DIFFERENTIAL-EFFECT BACKING VAT FOR COARSE AND FINE PARTICLES

[72] Inventors: Richard Cohen-Alloro, Orleans; Roger Cuvillier, Nanterre; Jean Grassaud, Orleans, all of France

[73] Assignee: Bureau De Recherches Geologiques Et Minieres, Paris, France

[22] Filed: Jan. 7, 1971

[21] Appl. No.: 104,617

[30] Foreign Application Priority Data

Jan. 7, 1970 France.....................7000396

[52] U.S. Cl. ..................209/426, 209/504, 209/500
[51] Int. Cl. ...............................................B03b 3/22
[58] Field of Search..................209/425–427, 455, 209/456

[56] References Cited

UNITED STATES PATENTS

| | | |
|---|---|---|
| 899,441 | 9/1908 | Taylor.................209/425 X |
| 2,242,020 | 5/1941 | Wood........................209/455 |
| 2,344,094 | 3/1944 | Kraut.........................209/455 |
| 2,743,816 | 5/1956 | Medley......................209/455 |
| 3,087,619 | 4/1963 | Kraut.........................209/456 |

Primary Examiner—Frank W. Lutter
Assistant Examiner—Ralph J. Hill
Attorney—Sughrue, Rothwell, Mion, Zinn & Macpeak

[57] ABSTRACT

A method and apparatus for gravimetrically separating particles of different sizes and densities. A conical, liquid filled vat is closed at its smaller bottom opening by a rigid, flexibly mounted diaphragm and at its larger top opening by a flexibly mounted filter bed having a permeable bottom. The diaphragm and bed are rigidly connected and reciprocably driven along a vertical axis. The differential liquid flow promotes the migration of denser particles through the bed and into the vat.

6 Claims, 3 Drawing Figures

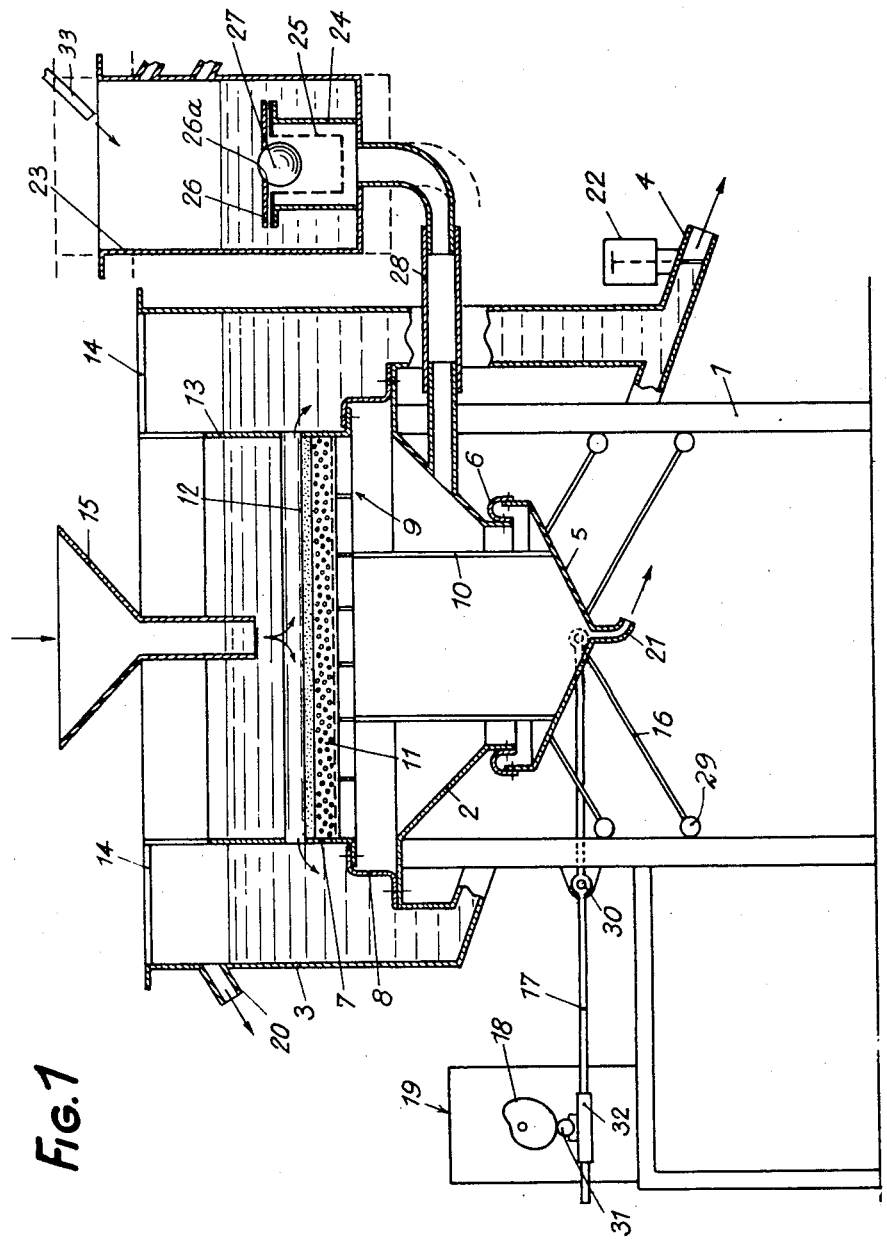

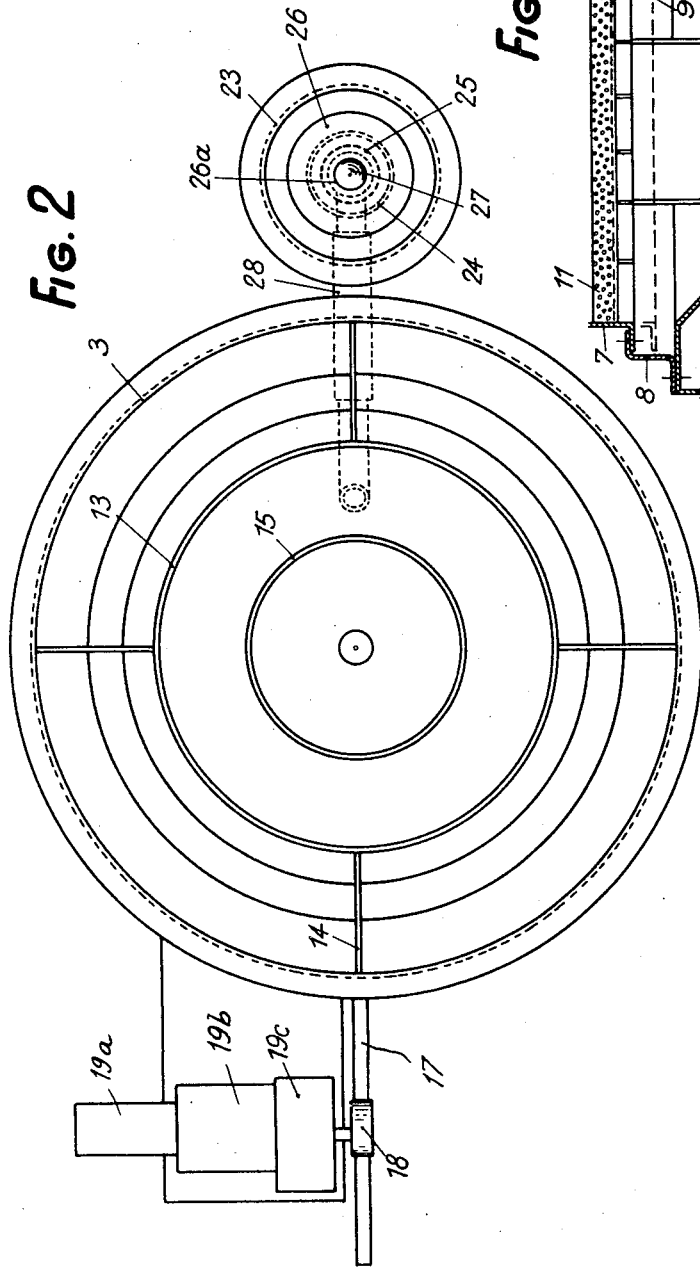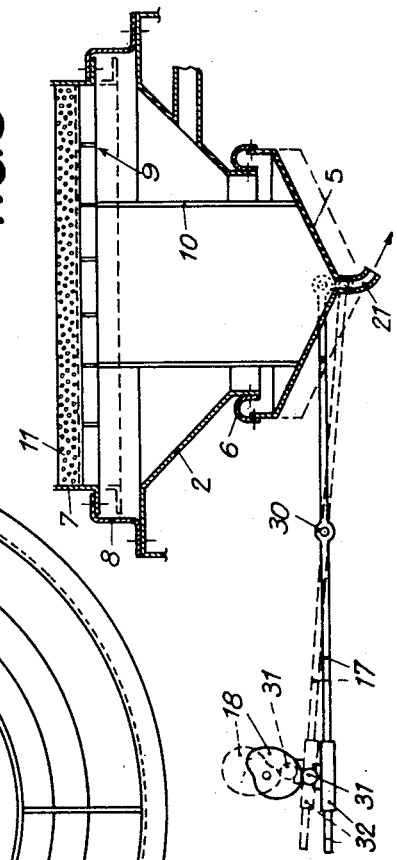

DIFFERENTIAL-EFFECT BACKING VAT FOR COARSE AND FINE PARTICLES

FIELD OF THE INVENTION

This invention relates to a method and an apparatus for the separation, in a moist medium, of a granular or pulverulent product whose constituents possess volume-weight differences, making it possible to promote this densimetric separation on the basis of particles with variable dimensions, even very fine ones, smaller than one one-hundredth of a micron.

BACKGROUND OF THE INVENTION

Apparatuses of this type, known under the name of diaphragm vats or jigs, use the backing effect coming from the alternating movement of a membrane or a free piston. These apparatuses exist in different versions. Generally speaking, they transmit pulsing and suction motions which are propagated through the products to be separated and they permit their densimetric classification and the selective extraction of the heaviest particles, on the one hand, and of the lightest residual fraction, on the other hand.

This classification is furthermore promoted in most cases by the presence of a medium with a suitable density, called bed, made up either of the product itself which has been calibrated in advance, or of a foreign material with a density or a nature that has been judiciously selected. This bed successively undergoes dilatations and retractions so that, at the moment of its expansion, it can be traversed by the theoretically densest particles, whereas the lightest particles of the upper layers are evacuated through the overflow of the particles.

The separation of the heavy particles and the light particles is then accompanied in the course of the dilatation of the bed. This dilatation is brought about by the rising movement of a volume of water pushed by the mechanical backing system, whose movement goes in the same direction as that of the water current. An unfavorable effect of this rising movement of the water is manifested upon the finest particles which, independently of their respective density, are moved toward the upper layers and overflow the apparatus with the fraction of particles considered to be light.

Such apparatuses are limited in terms of their utilization by their imperfection which manifests itself not only on the level of the general technical value of separation but also on the level of the grain sizes treated, whose densimetric classification decreases in efficiency, gradually, as the particles become finer. In effect, according to the regulating conditions adopted and the nature of the products treated, the conventional apparatuses furnish either a concentrate of heavy particles with a high content but low recovery, constituted essentially of particles with large dimensions, as we have just said, or a preconcentrate of heavy particles with greater recovery but with a low content because of the inevitable movement of fine, unclassified particles which have filtered through the bed, thus contaminating the preconcentrate. Furthermore, due to their mechanical design, these apparatuses are inoperative when we want to treat a product made up exclusively of fine particles with dimensions of less than one-tenth mm.

In this case, we generally run into difficulties in starting the fluidization due to the formation of an impermeable surface crust. This crust affords no free passage toward the bottom of the feed product and, through its own movement, disturbs the gravimetric classification of the subjacent particles. The unclassified assembly of these particles winds up by traversing the bed and contaminating the preconcentrate. In an effort to reduce this inconvenience somewhat, certain apparatuses add, to the principal rising water current, a secondary water current which compensates for the suction and which is designed to prevent the formation of the crust. But this produces a permanent upward movement of the fine particles, independently of their respective densities.

SUMMARY OF THE INVENTION

According to this invention for the gravimetric separation of granular or pulverulent materials in the form of coarse particles or in the form of fine particles smaller than one-tenth mm, or in the form of any kind of mixture of fine and coarse particles, we pour the mixture to which recoverable and recyclable particles, with a grain size greater than that of the products to be treated, can be added, in such a manner as to produce an extended layer of grains in a basket with a permeable bottom, attached on an elastic support connected to the walls of a vat filled with a liquid fluid. We then subject said basket to an alternate vertical movement, synchronized with conventional means for providing alternate movements of the liquid contained in the vat, such as a piston or a diaphragm.

Experience has shown that such a method offers the considerable advantage of eliminating not only the movement of the fine undesirable particles, which soil the dense products collected, through suction, but also the rejection of the fine particles of the dense products which were lost with the earlier apparatuses where the suction effect had to be systematically compensated by a supply of liquid from the outside that would oppose the descending movement of the water in the vat. In the method involved in this invention, we get, on the contrary, a remarkable sedimentation of dense products during the rising current of the liquid through the basket, a period of time in whose course the basket sinks into the liquid, causing the perfect fluidization of the bed and the materials to be treated. The apparatus according to the method recommended here employs a backing movement in a direction opposite to the one of the fluid which runs across the bed.

Furthermore, in the method of this invention the volume of liquid passing through the bottom of said basket, during its alternating movement synchronized with the alternating movement of the membrane or the piston that moves the liquid along, is greater than the volume of water displaced by said diaphragm or piston, whereas the movements of the basket and the piston have the same amplitude in order to produce a differential effect due to the inequality of the cross-sections of the bases of the vat, the upper base having a larger cross-section than the lower base. This method not only makes it possible to simplify the basket movement control mechanisms, since it suffices to have a simple mechanical connection between the basket and the piston, but also makes it possible to improve the regularity of the passage of the water through the basket and the separation in a fluidized bed in a homogeneous manner.

Further according to this invention, the movement of the basket is abruptly speeded up at the beginning of its descent, whereas the wave of the liquid above the materials contained in the basket is regulated by a system of fixed vertical walls acting as breakwaters. The regulation of the wave of the liquid synchronized with the abrupt descent of the basket results in liberating all of the grains of their support and these grains react differently in the rising water current which is uniform as a function of their volumes and their respective densities. Experience has shown that it is then very easy not only to separate the materials made up of particles with greatly varying dimensions but also to separate materials made up of very fine particles and with dimensions less than one-tenth of a mm. This result, which could not be obtained with the earlier processes, stems from the free sedimentation accomplished in a very short time, and continues throughout the entire fluidization of the bed and of the product to be treated without a disturbance of the liquid zone above the bed.

The method of this invention is improved even further by combining the movement of raising the basket with the operation of establishing contact between the vat, at a level situated between the basket and the piston, and an open liquid tank and by coupling the descending movement of the basket with the cutting of said connection, accompanied by a slight progressive and momentary withdrawal of the water below the basket. This enables us to eliminate the slight suction effect which occurs as a result of the rise of the basket and which would have brought about, if not the movement of the fine, low-density particles, since the suction effect produced by the process involved in this invention no longer has the same intensity as the suction effects produced by the earlier apparatuses, then at least a slowdown in the separation. In this way we can improve the speed of separation of materials treated while still retaining the purity of materials selected, especially in the case of a mixture of particles with varying grain sizes. On the other hand, a supply of liquid, designed to counteract the suction produced in the earlier apparatuses, employing a method consisting in pushing and aspirating a volume of water by the direct effect of a piston or a diaphragm across the layer of products to be fluidized, brings about a disturbance of the medium since the supply of water, if it is to be effective, must oppose the descending current produced by the withdrawal of the piston, thus bringing about the rejection of the light particles through the overflow of the bed. The application of the method with differential effect, as involved in this invention, on the contrary only very slightly slows down the thrust effect of the liquid in the course of the descent of the basket and prevents the beginning of suction during the thrust of the water by the piston and the beginning of the rise of the basket by establishing contact between the vat and an open tank containing liquid. In this way we can prevent any kind of disturbances which were due to the more or less intensive countercurrent created in the earlier compensation systems.

The apparatus for implementing the process of this invention involves a vat having an upper opening with a cross-section larger than that of the lower opening, a mobile part, connected along a strictly vertical axis, in a sealed and elastic fashion, to said lowering opening, a device for the alternating movement of said mobile part, a basket support of solid particles to be involved in fluidization, said basket having a horizontal bottom which is permeable to the passage of liquid filling said vat, as well as to the dense particles separated in the course of the operation, a means for elastic and sealed attachment connecting said basket to the periphery of said upper opening of said vat, and internal means making the mobile part into one piece with said basket, said vat being surrounded by a tank whose liquid covers said basket.

In this way we get a very simple apparatus in which the liquid volume passing across the surface of the bottom of the basket in the course of its rising or descending movement is greater than that displaced by the mobile part.

This apparatus further involves a system of breakwater walls plunged into the upper zone of the fluid, a charging hopper along the axis of the vat, and at least one axis opening leading to the wall of the vat at a level between the mobile part and the basket, said opening being connected by a flexible and deformable conduit to a tank equipped with a liquid inlet and a float valve regulating the passage of the liquid contained in the vat toward said tank.

BRIEF DESCRIPTION OF THE DRAWINGS

Other advantages and features of the invention will emerge from the following specifications given here with reference to the attached drawings which, by way of nonrestrictive example, represent one apparatus using the densimetric separation process through backup movement in the opposite direction to that of the fluid traversing the bed.

In the drawings:

FIG. 1 is an elevation and cross-section view of an apparatus of this invention, FIG. 2 is a plan view of FIG. 1, and FIG. 3 is a diagram showing the volume differences produced by the displacements of the mobile parts of the apparatus shown in FIG. 1.

In FIG. 1 we see a frame 1 to which is attached, in a rigid fashion, the circular body 2 of the backup vat. A circular vat with an inclined bottom 3 is attached to frame 1 and vat 2. It carries an emptying member in its lower portion 4 which can be provided with an automatic opening and closing device 22 and an overflow 20 in its upper portion.

The lower portion of vat 2 is equipped with a mobile part 5 that acts as a piston or diaphragm. It is connected to vat 2 by an elastic and flexible device 6 and at its lowest point has an evacuation conduit 21 for the evacuation of the concentrates made up of dense particles that have traversed the basket.

A basket 7 is connected to the upper portion of vat 2 by another elastic and flexible device 8. In the example shown, basket 7 has a cylindrical shape. It is equipped with a perforated bottom 9 which supports the bed and may be made up of an element consisting of only one substance, such as sheet metal, perforated sheet metal, a bar-grid, porous bottoms made of metal or plastic material, flexible or rigid, etc. It can also be made by any combination of these elements. The filter bed, which is designed to permit the preferential passage of the heavy particles, is shown at 11 and the product being treated is shown at 12.

Basket 7 is connected, by means of its bottom 9, to piston 5 through crosspieces 10.

A breakwater device 13 is attached to vat 3 by a rigid support 14 which holds the charge hopper 15.

The mobile part 5 of vat 2 is guided vertically by rods 16 equipped with rollers 29 that ride on vertical tracks of frame 1.

An alternating movement is imparted to part 5 by lever 17 articulated at 30 upon frame 1. A cam 18, with a profile specially developed so as to reveal an abrupt profile variation in order to bring about, in each cycle, the abrupt displacement of the basket, is made to rotate by a motor group 19 and contacts the lever 17 through a roller 31 mounted on a support 32 which can be moved along lever 17. The motor group 19 preferably involves a speed changer so as to furnish the desired cadence for the movement of the mobile part.

An auxiliary moderating device, shown by tank 23, can be connected to vat 2 by means of a flexible, expansible sleeve 28. The tank 23 contains an enclosure 24 comprising a basket 25 and a lid 26 equipped with an opening 26a. A float 27 moves in the basket 25.

In the plan view in FIG. 2, we again find vat 3, breakwater 13, hopper 15, as well as their supports 14, which connect them to vat 3. We also see moderating device 23, the lid 26 of the enclosure 24, the float 27 and the flexible connecting sleeve 28. FIG. 2 shows the assembly of the motor group made up of motor 19a, speed changer 19b, and reducing gear 19c, controlling the cam 18 which activates the lever 17.

In order to bring out the liquid volumes V and v, which are moved, respectively, by the movement of basket 7 and the mobile part 5, acting as a piston, we have shown in FIG. 3 only the mobile assembly made up of basket 7 and piston 5, controlled by lever 17. In the drawing we can see that, because of the amplitude H of the movement, the volume V, produced by the displacement of the basket 7, is greater than the volume v, produced by the movement of the piston 5. From this it results that, during the descent of the piston 5, the basket 7 is subjected to an upward pulsation of the fluid, with the fluid volume traversing the permeable bottom of basket 7 being equal to V — v.

The apparatus shown in FIG. 3 can also be used with the moderating device 23 in FIG. 1. We can see that, contrary to the earlier devices, the rise of the piston does not produce a pulsation of the liquid toward the top, through basket 7, but rather a relatively slow suction because of the shape given to cam 18. In the course of this period, there is no disturbance of the bed, and the dense materials here gather at the bottom of the bed while passing through the permeable floor. As we reverse the movement, the basket 7 and piston 5 are abruptly returned to their original position where they remain for an interval of time during which the free sedimentation of the particles occurs.

In order to increase the output and the separation speed when the material to be treated contains particles with varying grain sizes, we use the regulating device shown in FIGS. 1 and 2, as we saw earlier.

During the rise of basket 7 and mobile part 5, the start of suction, produced by these displacements, is immediately reduced by the inflow of liquid contained in tank 23 and in the connecting channel leading to vat 2. Sleeve 28 is deformed, responding immediately to the pull of the liquid inside vat 2. This liquid displacement brings about the opening of float valve 27 which leaves its place 26a thus providing communication between tank 23 and vat 2.

Inversely, during pulsation, that is to say, during the abrupt descent of the basket, a portion of the impulse is absorbed by the inflation of extensible sleeve 28, thus giving greater mechanical flexibility to the apparatus and better fluidization since no disorderly disturbance of the bed can occur.

Device 23 may be regulated in terms of height so as to furnish a volume of liquid suitable for vat 2. When valve 27 is used, we compensate the loss of liquid by direct supply represented schematically at 33.

We eliminate any parasite wave effect by using a breakwater 13 whose walls are submerged in the upper zone of the liquid. By way of example, the breakwater may be made up of walls in the prolongation of the walls of the basket 7. We thus promote the free sedimentation of fine particles in suspension in the fluid.

The movement of the products to be treated is performed with the help of a central hopper 15, permitting the deposit of materials to be treated in the center and above the bed 11, that is to say, in the center of the surface layer 12.

The movements of the fluid, as well as those of basket 7, bring about the radial displacement of the particles which, during this action, undergo the desired densimetric classification effect. At the end of the run, the light products overflow at the periphery of basket 7 and fall into the recovery vat 3 from which they flow along the slanted bottom of this tank in order then to be evacuated at 4, either continuously or periodically, by a valve 22.

According to one variation, we can use the regulating device without the valve 27. The pulsation effect is then reduced and it diminishes, just like the suction effect. The fluid contained in vat 2 is then in permanent communication with vat 23 of the regulating device. There is then a tendency toward the establishment of a constant level between the water level in vat 3 and that in tank 23.

Experiments have shown that this manner of utilization, without a float valve, is particularly well suited to the treatment of extra-fine particles, smaller than one-tenth mm. In the case of coarse particles, whose dimension is, for example, greater than 1 mm, the apparatus furnishes high-yield separation without the moderating device.

We claim:

1. An apparatus for the gravimetric separation of granular or pulverulent materials, comprising:
    a. a vertically oriented container having top and bottom openings, the top opening having a larger cross-sectional area than the bottom opening,
    b. a movable member sealingly connected by elastic means to the bottom opening,
    c. driving means for imparting a reciprocating vertical movement to the movable member,
    d. a basket member having a horizontal floor that is permeable to both liquid filling the container and to particles to be separated from the granular or pulverulent material,
e. elastic means for sealingly connecting the basket member to the top opening of the container,
f. means rigidly connecting the basket member to the movable member for movement therewith, and
g. a tank surrounding the container and containing liquid at a level sufficient to cover the basket member.

2. An apparatus as recited in claim 1 further comprising:
a. a breakwater wall secured to the tank and suspended in the liquid above the basket member, the basket member having an outer wall aligned with the breakwater wall,
b. a charging hopper for supplying granular or pulverulent material to be separated to the basket member,
c. a second liquid container connected to the vertically oriented container at a position between the basket member and the movable member by a flexible and deformable conduit, and
d. valve means within the second container for regulating the flow of liquid into the vertically oriented container.

3. An apparatus as recited in claim 1 wherein the driving means includes a cam profiled to cause a gradual rise and a rapid fall of the movable member.

4. An apparatus as recited in claim 1 wherein:
a. the movable member has an inclined bottom with an opening therein for the discharge of dense particles that have been separated out through the basket member, and
b. the tank has an inclined bottom with an opening therein for the discharge of dense particles that have moved across the top of and overflowed the basket member.

5. A method for the gravimetric separation of granular or pulverulent materials, comprising:
a. forming a layer of granular or pulverulent materials in a basket member having a permeable bottom and being sealingly and flexibly connected to the top opening of a vertically oriented, liquid filled container,
b. imparting a reciprocating vertical motion to a rigid member sealingly and flexibly connected to the bottom opening of the container, said bottom opening having a smaller cross-sectional area than said top opening, and
c. simultaneously imparting said reciprocating vertical motion to the basket member in synchronization with the motion imparted to the rigid member.

6. A method as recited in claim 5 wherein the reciprocating vertical motions are equal in amplitude and are characterized by a gradual rise and a rapid fall.

* * * * *